United States Patent [19]

Spanoudis

[11] 3,946,128

[45] Mar. 23, 1976

[54] LASER ASSEMBLIES USING GLASS DISCS WITH LEAD BORATE COATINGS

[75] Inventor: Louis Spanoudis, Toledo, Ohio

[73] Assignee: Owens-Illinois, Inc., Toledo, Ohio

[22] Filed: Feb. 13, 1973

[21] Appl. No.: 331,754

[52] U.S. Cl. .................. 428/66; 428/427; 428/428; 428/194; 106/47 Q; 106/53; 252/301.4 F; 252/301.6 R; 252/301.6 F; 331/94.5 E
[51] Int. Cl.² .................. B32B 17/06; C09K 11/08; C09K 11/10; C03C 3/12
[58] Field of Search .................. 117/124 A, 125; 252/301.4 F; 331/94.5 E; 156/47 R, 47 Q, 53; 161/192; 428/66, 194, 427, 428

[56] References Cited
UNITED STATES PATENTS

| | | | |
|---|---|---|---|
| 3,127,278 | 3/1964 | Francel et al. .................. | 106/53 |
| 3,291,586 | 12/1966 | Chapman et al. .................. | 106/53 |
| 3,462,252 | 8/1969 | Veres .................. | 106/53 |
| 3,599,106 | 8/1971 | Smitzer .................. | 331/94.5 E |
| 3,621,456 | 11/1971 | Young .................. | 331/94.5 E |
| 3,626,319 | 12/1971 | Young .................. | 331/94.5 E |
| 3,702,976 | 11/1972 | Young .................. | 331/94.5 E |

*Primary Examiner*—Patrick P. Garvin
*Assistant Examiner*—Mark Bell
*Attorney, Agent, or Firm*—Richard D. Heberling; E. J. Holler

[57] ABSTRACT

A laser assembly and a novel glass laser disc having an annular lead borate glass coating for use in the assembly is disclosed, the annular coating being capable of absorbing energy at a wavelength of 1.06 microns to thereby absorb parasitic oscillations. The outstanding glass coating has an index of refraction not substantially less than the index of refraction of the glass disc, the glass coating containing an effective energy-absorbing amount of a heavy metal oxide, such as $Sm_2O_3$ and $CuO$, for absorbing energy at a wavelength of about 1.06 microns. The heavy metal oxides includes oxides of transition metals of the 3d, 4d, 4f and 5f orbital series.

26 Claims, 3 Drawing Figures

FIG. 1
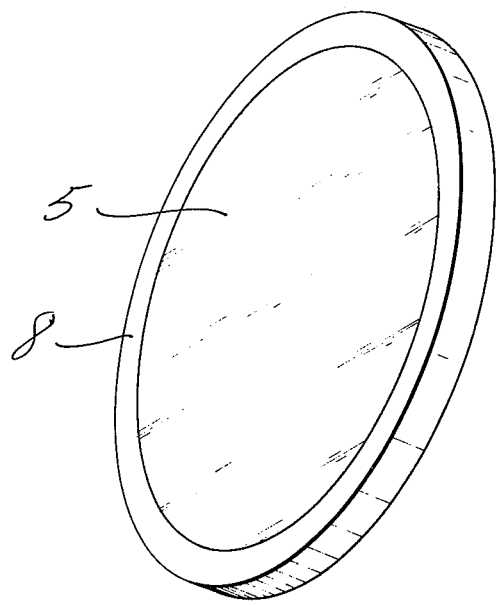
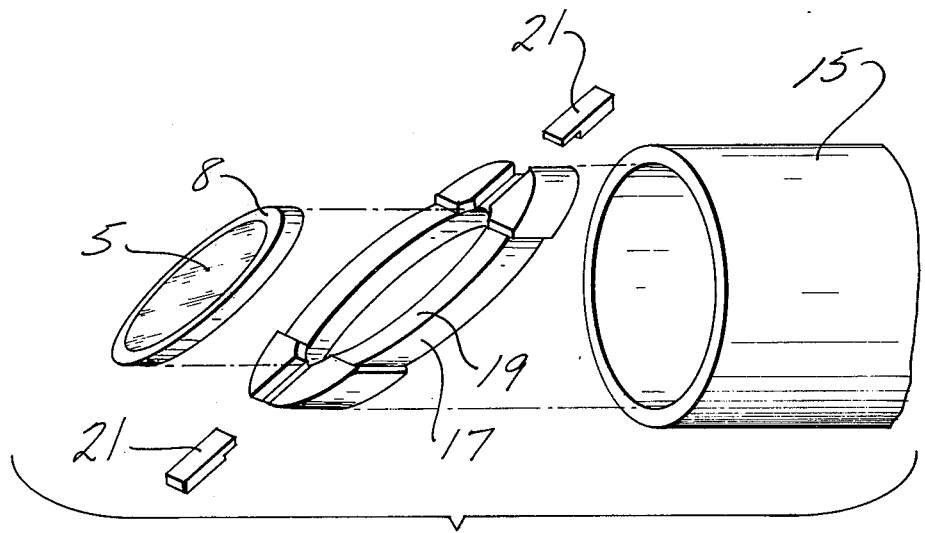
FIG. 2

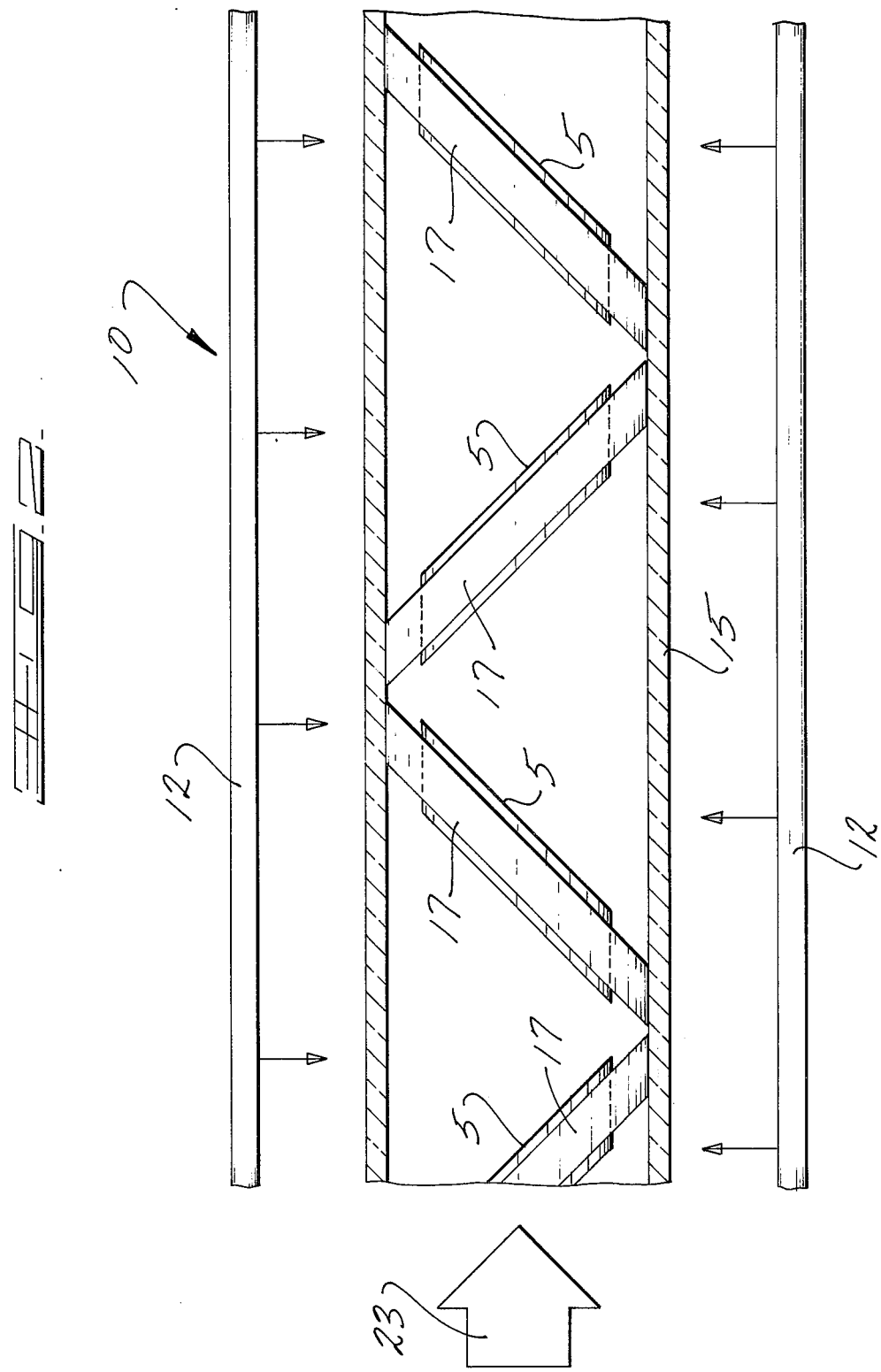

LASER ASSEMBLIES USING GLASS DISCS WITH LEAD BORATE COATINGS

BACKGROUND OF THE INVENTION

The present invention relates to a glass laser disc having an annular glass coating capable of absorbing energy at a wavelength of about 1.06 microns. The present invention also is directed to a laser assembly including the glass laser disc. The present invention also relates to the new use of glass coatings for glass laser discs in which the new use includes coating the disc around the periphery thereof, with a lead borate glass capable of absorbing energy at a wavelength of about 1.06 microns, pumping the laser disc to cause an energy-inversion, and passing monochromatic light through the disc to cause stimulated emission, and absorbing energy at a wavelength of 1.06 microns in the glass coating to thereby prevent parasitic oscillations.

It is an object of the present invention to provide a glass laser disc having an annular lead borate glass coating, the glass coating having an index of refraction not substantially less than the index of refraction of the glass disc, the thermal expansion and contraction of the coating being sufficiently compatible and matched with the glass disc so as to prevent the development of undesirable strains in the disc, the glass coating containing an effective energy-absorbing amount of a heavy metal oxide for absorbing energy at a wavelength of 1.06 microns to thereby prevent parasitic oscillations.

It is an object of the present invention to provide a glass laser disc having an annular lead borate glass coating, the glass coating having an index of refraction nearly the same as or greater than the index of refraction of the glass disc, the thermal expansion and contraction properties of the coating being sufficiently compatible with the disc so as to prevent the development of strains therein, the glass coating containing an effective energy-absorbing amount of $Sm_2O_3$ for absorbing energy at a wavelength of about 1.06 microns to thereby prevent parasitic oscillations.

It is an object of the present invention to provide a glass laser disc having an annular lead borate glass coating capable of absorbing energy at a wavelength of about 1.06 microns, the glass coating having the following approximate composition:

| Ingredient | Percent By Weight |
|---|---|
| $SiO_2$ | 1 – 8 |
| ZnO | 0 – 15 |
| PbO | 50 – 75 |
| $B_2O_3$ | 8 – 16 |
| BaO | 0 – 3 |
| $Sm_2O_3$ | 1 – 10 |

It is an object of the present invention to provide a glass laser disc having an annular lead borate coating capable of absorbing energy at a wavelength of about 1.06 microns to prevent parasitic oscillations, the glass coating containing an effective energy-absorbing amount of CuO for absorbing energy at a wavelength of about 1.06 microns.

It is an object of the present invention to provide a glass laser disc having an annular lead borate glass coating capable of absorbing energy at a wavelength of 1.06 microns, the glass coating having an index of refraction the same as or greater than the index of refraction of the glass disc, the thermal expansion and contraction properties of the coating being sufficiently compatible with the glass disc so as to prevent strains from developing in the disc, the glass coating having the following approximate composition:

| Ingredient | Percent By Weight |
|---|---|
| $SiO_2$ | 1 – 8 |
| ZnO | 0 – 15 |
| PbO | 50 – 75 |
| $B_2O_3$ | 8 – 16 |
| BaO | 0 – 3 |
| $MnO_2$ | 1 – 10 |
| $Co_2O_3$ | 0.01 – 10 | the sum of $Co_2O_3$ and $MnO_2$ being not substantially greater than about 15%.

It is an object of the present invention to provide a laser assembly comprising means for providing a source of pumping light; means for defining a cavity for a lasing material including a housing; means for holding a glass laser disc in the housing and a glass laser disc located within the housing for causing stimulated emission, the disc having an annular lead borate glass coating capable of absorbing energy at a wavelength of 1.06 microns to effectively absorb any parasitic oscillations, the glass coating having an index of refraction that is substantially not less than the index of refraction of the glass laser disc, the thermal expansion and contraction of the coating being sufficiently compatible with the thermal expansion and contraction of the glass laser disc so as to prevent the development of undesirable strains in the disc, the glass coating containing an effective energy-absorbing amount of a heavy metal oxide for absorbing energy at a wavelength of about 1.06 microns.

It is an object of the present invention to provide a laser assembly including a glass laser disc having an annular lead borate glass coating capable of absorbing energy at a wavelength of 1.06 microns, the glass coating having an effective energy absorbing amount of $Sm_2O_3$ for absorbing energy at a wavelength of about 1.06 microns.

It is an object of the present invention to provide a laser assembly including a glass laser disc having an annular lead borate glass coating containing an effective, energy absorbing amount of CuO for absorbing energy at a wavelength of about 1.06 microns.

It is an object of the present invention to provide a laser assembly including a glass laser disc having an annular lead borate glass coating containing an effective energy absorbing amount of a mixture of heavy metal oxides comprising $MnO_2$ and $Co_2O_3$ for absorbing energy at a wavelength of about 1.06 microns to prevent parasitic oscillations.

It is an object of the present invention to provide the new use of a glass coating for a glass laser disc, the new use comprising the steps of:
a. coating the periphery of the glass laser disc with a lead borate glass to provide thereon an annular coating containing an effective, energy absorbing amount of a heavy metal oxide for absorbing energy at a wavelength of about 1.06 microns;
b. pumping the disc to cause an energy inversion; and
c. passing monochromatic light through the disc to cause stimulated emission and also preventing any parasitic oscillations by absorbing energy at a wavelength of 1.06 microns in the coating.

These and other objects will be apparent from the specification that follows, the appended claims, and the drawings in which:

FIG. 1 is a top plan view of a glass laser disc having an annular lead borate glass coating:

FIG. 2 is a fragmentary elevated view of a laser assembly including a plurality of glass laser discs having annular lead borate glass coatings within the housing of the laser assembly; and FIG. 3 is a perspective exploded view of a glass laser disc having an annular lead borate glass coating and means for holding the disc in the laser assembly.

The present invention provides a glass laser disc having an annular lead borate glass coating for absorbing energy at a wavelength of 1.06 microns to thereby absorb parasitic oscillations, the glass having an index of refraction that is about the same as or greater than the index of refraction of the glass disc, the thermal expansion and contraction of the coating being sufficiently compatible and matched with the glass disc so as to prevent development of undesirable strains therein, the glass coating containing an effective energy-absorbing amount of a heavy metal oxide for absorbing energy at a wavelength of about 1.06 microns. The heavy metal oxides include oxides of transition metals of the 3d, 4d, 4f and 5f orbital series.

The present invention also provides a laser assembly comprising means for providing a source of pumping light; means defining the cavity for a lasing material including a housing; a glass laser disc located within the cavity for causing stimulated emission when monochromatic light is passed through the disc; and means for holding the glass disc in the housing, the disc having an annular lead borate glass coating, the glass coating having an index of refraction that is not substantially less than the index of refraction of the glass disc, the thermal expansion and contraction properties of the coating being sufficiently compatible with and matched with the properties of the glass disc so as to prevent the development of undesirable strains therein, the glass containing an effective energy-absorbing amount of a heavy metal oxide for absorbing energy at a wavelength of about 1.06 microns to thereby prevent the development of parasitic oscillations.

The present invention also provides the outstanding new use of a glass coating for a glass laser disc, the new use comprising the steps of:

a. coating the disc with a lead borate glass around the periphery thereof to provide an annular coating that contains an effective energy-absorbing amount of a heavy metal oxide at a wavelength of about 1.06 microns; and b. pumping the glass laser disc to cause an energy inversion; and c. passing monochromatic light through the disc to cause stimulated emission, and preventing parasitic oscillations by absorbing energy at a wavelength of 1.06 microns in the glass coating.

As seen in FIGS. 1 and 2, a glass laser disc 5 is provided, having an annular glass coating 8 for absorbing energy at a wavelength of 1.06 microns to absorb parasitic oscillations.

The undesirable effects of parasitic oscillations is described, for instance, in U.S. Pat. No. 3,508,165 to Nicolai. This patent is incorporated by reference for its disclosure of the problem of parasitic oscillation or a depumping due to the whispering mode of operation in which a wave front is internally reflected several times along an internal path within the disc.

As seen in FIG. 2, a laser assembly 10 is provided that includes flash tubes 12 as a means for providing a source of pumping light. There is provided means for defining a cavity within the flash tubes in the laser assembly including a substantially cylindrical housing 15. Also provided is means for holding the glass laser disc in the cavity, including a plurality of holding members 17 that are attached to the housing and adapted for holding the discs 5. As seen in the exploded view (FIG. 3) of the disc 5 and the holder 17 in the embodiment the disc is conveniently held on one face 19 of the holder by means of fastening members 21.

The laser assembly is operated usually as an amplifier rather than an oscillator, with a source of monochromatic light that provides a beam of monochromatic light such as a laser beam indicated by the arrow 23. The discs in the assembly are pumped by the flashlight to cause an energy inversion, and the monochromatic light beam 23 is passed through each of the discs to cause stimulated emission. At the same time, parasitic oscillation is prevented by the absorbing of energy at a wavelength of about 1.06 microns by the annular glass coating 8 on each of the discs.

The outstanding glass laser disc, with its annular coating for absorbing energy at a wavelength of 1.06 microns, can be prepared by coating a laser disc with an easily-processable and formable lead borate glass having an effective energy-absorbing amount of a metal oxide, preferably $Sm_2O_3$ or $CuO$, for absorbing energy at a wavelength of 1.06 microns.

Suitable heavy metal oxides for use in the energy-absorbing coatings include oxides of the transition metals of the 3d, 4d, 4f and 5f orbital series. Such suitable energy-absorbing oxides are $MnO_2$, $Co_2O_3$, $Cr_2O_3$, $Fe_2O_3$, $V_2O_5$, $CuO$, $NiO$, $MoO_3$, $WO_3$ and $Sm_2O_3$. Also suitable for oxides of Dy, Tm, Tb and U. The oxides are those of transition metals, broadly having an atomic number between 23 and 92 that absorb at 1.06 microns and specifically those having an atomatic number between 23–29 (V, Cr, Mn, Fe, Co and Cu) or 42 (Mo) or 62 (Sm) or 66 (Dy) or 69 (Tm) or 70 (Yb) or 74 (W) or 92 (U). It is understood that the oxides listed above are present in the batch in the form as set forth above but that the oxides are usually present in two or more forms in the glass. For instance, it is understood that the manganese oxide is present in the glasses and reported as $MnO_2$, but that the oxide is usually present both as $MnO_2$ and $Mn_2O_3$ with the $MnO_2$ probably being the major portion and the $Mn_2O_3$ being the active energy-absorbing portion of the manganese oxide. Likewise, it is understood that, in the case of the other heavy metal oxides, the particular oxide probably is present in two or more forms. In the case of tungsten oxide, it is reported $WO_3$, although it is usually present both as $WO_3$ and $W_2O_5$ with $WO_3$ probably being the major portion. Cobalt oxide is reported as $Co_3O_4$, although it might be present as a mixture of $CoO$ and $Co_2O_3$ in which $CoO$ is probably the major portion. Chromium oxide is reported as $Cr_2O_3$, but it is usually present both as $Cr_2O_3$ and $CrO_3$ with $Cr_2O_3$ probably being the major portion. Iron oxide is reported as $Fe_3O_4$, although it is present as a mixture of $FeO$ and $Fe_2O_3$ with the $Fe_2O_3$ probably being the major portion. Vanadium oxide is reported as $V_2O_5$, although it is usually present as a mixture of $V_2O_5$ and $V_2O_3$ with $V_2O_5$ probably being the major portion. Copper oxide is reported as CuO, although the oxide is usually present as CuO and $Cu_2O$ with CuO probably being the major portion. Nickel oxide is reported as NiO, but it is understood that the oxide is present both as NiO and $Ni_2O_3$, with NiO probably being the major portion.

In general, the heavy metal oxides are present in an amount of about 1 to 10% by weight and preferably 2 to 7% by weight. Although $Co_3O_4$ is preferably used in amounts of 1% or more by weight, it can be used in amounts as low as 0.01% by weight. In general, the sum of the heavy metal oxides in the annular glass coating should not be substantially greater than about 15% by weight and preferably should not be substantially greater than about 10% by weight.

When a mixture of $Co_3O_4$ and $MnO_2$ is used, $Co_3O_4$ is generally present in an amount of about 5 to 6% by weight, and $MnO_2$ is present in an amount of about 4 to 5% by weight.

Suitable, preferred and optimum glass coatings utilizing $Sm_2O_3$ as the energy-absorbing oxide have the following approximate composition, it being understood that the oxides listed are present in the batch:

| Ingredient | General % by Wt. | Preferred % by Wt. | Optimum % by Wt. |
|---|---|---|---|
| $SiO_2$ | 1 – 8 | 2 – 7 | 4 – 7 |
| ZnO | 0 – 15 | 0 – 12 | 6 – 10 |
| PbO | 50 – 75 | 60 – 75 | 60 – 68 |
| $B_2O_3$ | 8 – 16 | 8 – 15 | 10 – 14 |
| BaO | 0 – 3 | 0 – 2 | 0.1 – 1 |
| $Sm_2O_3$ | 1 – 10 | 1 – 10 | 2 – 7 |
| CdO | 0 – 2 | 0 – 2 | — |
| MgO | 0 – 2 | 0 – 2 | — |
| CaO | 0 – 2 | 0 – 2 | — |
| SrO | 0 – 2 | 0 – 2 | — |

Within the above optimum range, excellent results have been obtained in which the glass coating has the following approximate composition:

| Ingredient | Percent by Weight |
|---|---|
| $SiO_2$ | 5 |
| ZnO | 8 |
| PbO | 64 |
| $B_2O_3$ | 12 |
| BaO | 0.5 |
| $Sm_2O_3$ | 10 |

Suitable general, preferred and optimum glass coatings, when CuO is used as the energy-absorbing oxide, have the following approximate compositions:

| Ingredient | General % by Wt. | Preferred % by Wt. | Optimum % by Wt. |
|---|---|---|---|
| $SiO_2$ | 1 – 8 | 2 – 7 | 4 – 7 |
| ZnO | 0 – 15 | 0 – 12 | 6 – 10 |
| PbO | 50 – 75 | 60 – 75 | 60 – 68 |
| $B_2O_3$ | 8 – 16 | 8 – 15 | 10 – 14 |
| BaO | 0 – 3 | 0 – 2 | 1 – 2 |
| CuO | 1 – 10 | 2 – 7 | 2 – 7 |
| CdO | 0 – 2 | 0 – 2 | — |
| MgO | 0 – 2 | 0 – 2 | — |
| CaO | 0 – 2 | 0 – 2 | — |
| SrO | 0 – 2 | 0 – 2 | — |

Within the above described optimum range, good results have been obtained in which the glass coating has the following approximate composition:

| Ingredient | Percent by Weight |
|---|---|
| $SiO_2$ | 5.24 |
| ZnO | 8.39 |
| PbO | 68.58 |
| $B_2O_3$ | 12.58 |
| CuO | 5.24 |

Suitable preferred and optimum glass coatings utilizing manganese oxide and cobalt oxide to absorb energy have the following approximate compositions:

| Ingredient | General % by Wt. | Preferred % by Wt. | Optimum % by Wt. |
|---|---|---|---|
| $SiO_2$ | 1 – 8 | 2 – 7 | 4 – 7 |
| ZnO | 0 – 15 | 0 – 12 | 6 – 10 |
| PbO | 50 – 75 | 60 – 75 | 60 – 68 |
| $B_2O_3$ | 8 – 16 | 8 – 15 | 10 – 14 |
| BaO | 0 – 3 | 0 – 2 | 0.1 – 1 |
| $MnO_2$ | 1 – 10 | 2 – 10 | 2 – 7 |
| $Co_2O_3$ | 0.01 – 10 | 0.01 – 10 | 2 – 7 |
| CdO | 0 – 2 | 0 – 2 | — |
| MgO | 0 – 2 | 0 – 2 | — |
| CaO | 0 – 2 | 0 – 2 | — |
| SrO | 0 – 2 | 0 – 2 | — | the sum of $Co_2O_3$ and $MnO_2$ being not substantially greater than about 15%.

The present invention solves a problem in the use of laser discs in laser assemblies by providing an easily-processable low-melting lead borate glass for providing an annular coating thereon. Advantageously, the low melting lead borate coatings can be applied to the outer edge of the disc at temperatures as low as about 500°C., and preferably below about 470°C. or even as low as 450°C. to 435°C., so that the properties of the glass disc will be not affected by the application of the annular coating.

A suitable low melting host glass for the energy-absorbing heavy metal oxides is disclosed in U.S. Pat. No. 3,654,505, which is hereby incorporated by reference for its disclosure of a suitable glass for the heavy metal oxide absorber and method for preparing such low melting glasses. As disclosed therein, for instance, the lead borate glasses can be formed at a temperature of about 400°C. to 475°C., and preferably at about 435° to 455°C. In the present invention, the annular glass coating preferably is fused to the glass disc and bonded thereto at a temperature of about 435° to 455°C.

The low melting lead borate glasses also provide an index of refraction in the annular coating that is the same or greater than the index of refraction of the disc. Typically, the resultant lead borate glass coatings have an index of refraction in the range of about 1.8 or 1.9 as compared to an index of refraction of about 1.55 or 1.56 for a glass laser disc made of a lithia-calcia-alumino-silicate glass laser disc.

The glass laser disc can be made from the glass laser compositions disclosed in U.S. Pat. Nos. 3,457,182 and 3,471,409. The U.S. patents are hereby incorporated by reference for their disclosure of the preferred glass laser disc compositions. Excellent results are obtained with the glass compositions set forth in the above incorporated U.S. Pat. No. 3,471,409 to Lee and Rapp, which discloses glass laser compositions having the following ingredients in approximate mole percent:

| Ingredient | Mole Percent |
|---|---|
| $SiO_2$ | 45 – 75 |

-continued

| Ingredient | Mole Percent |
|---|---|
| $Al_2O_3$ | 0 – 8 |
| $Li_2O$ | 15 – 35 |
| CaO | 1/2 – 30 |
| $Nd_2O_3$ | 1/10 – 2 |

Other glass laser compositions suitable for the preparation of glass discs for the present invention are also disclosed in U.S. Pat. Nos. 3,640,890 and 3,640,891, which are incorporated by reference.

The laser glass compositions can be melted or formed by methods well known in the art, as for instance, described in U.S. Pat. No. 3,656,924, to Chapman and LeSueur, which is incorporated by reference. As is well known in the art, the molten laser glass can be conveniently cast into the form of discs for use in the present invention.

When $Sm_2O_3$ and CuO are used as the energy-absorbing heavy metal oxides, it is possible to pump through the annular coatings which provide some advantages. The coatings containing $Sm_2O_3$ and CuO transmit light in the visible range, and so it is possible to pump the discs through the coatings, which is in contrast to coatings containing manganese oxide and cobalt oxide as the heavy metal oxide energy absorbers.

The melting techniques used to melt the glass laser compositions and the low melting lead borate compositions are well known in the art. In general, the melting technique for the low melting lead borate glasses include the melting of the batch compositions in a platinum crucible or platinum lined furnace that is preferably electrically heated. Generally, the batch compositions are melted at about 2400°F. and thereafter the furnace temperature lowered to around 1700°F. for about 4 hours. The resultant lead borate glass, when thoroughly heated and homogenized, is then quenched by conventional fritting techniques to form glass frit. The resultant glass frit is generally ground dry for around 2 hours in a ball mill using alumina rods to provide a powdered glass that is screened to about a 100 mesh size. The powdered glass is prepared for a coating for discs by adding isobutyl alcohol and wet milling for about 24 hours. The material has 100% of its particles less than about 12 microns. As is conventional in the art, a binder such as nitrocellulose is added to the finely ground material and generally the material is applied to the discs by, for instance, dipping or spraying. Thereafter, the coatings can be conveniently heated to about 842°F. (about 450°C.) for about 1 hour. The temperature employed generally must be sufficient to cause the coating glass to melt and flow evenly onto the edges of the laser disc. Thereafter, the disc is cooled at a predetermined rate sufficient so as not to create any undesirable strains in the glass. However, the temperature should not be so high as to cause the material to flow over the edge of the disc onto the face thereof. In general, the time and temperature employed in fusing the coating onto the disc is dependent upon the thickness of the coating and the mass of the disc.

The discs that are coated according to the present invention are generally of a size of from about 4 inches to 20 or more inches in diameter when the discs are circular in cross section. The thickness of the disc generally varies from about one-fourth inch to about 2 inches. Generally, the discs are elliptical in form as shown in FIG. 1 and generally the long axis of the ellipse is about 6 to 20 inches and the short axis is about 3 to 10 inches although as is well known in the art, many sizes and shapes of discs can be employed, particularly in laser assemblies where the discs are used as amplifiers.

The lead borate coatings generally have a thickness ranging as low as about 1 micron to as high as about 1 millimeter (1,000 microns) and preferably the coatings are at least 2 to 3 microns in thickness with about 4 to 10 or 12 microns being a preferred range.

The following examples are intended to illustrate the present invention and not to limit the same in any way.

EXAMPLE 1

A laser disc such as shown in FIG. 1 was prepared having a circular shape having a 2 inch diameter and a thickness of about one-fourth inch from a glass laser composition having the following approximate composition:

| Ingredient | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |
| $CeO_2$ | 0.16 |

The disc was coated with a lead borate glass composition having the following approximate composition:

| Ingredient | Percent by Weight |
|---|---|
| $SiO_2$ | 5 |
| ZnO | 8 |
| PbO | 64 |
| $B_2O_3$ | 12 |
| BaO | 0.5 |
| $Sm_2O_3$ | 10 |

The glass coating composition was prepared from raw batch materials as is well known in the art and the coating applied to the outer periphery of the disc and fused thereto at a relatively low temperature of about 455°C. with no damage to the glass disc. The thickness of the lead borate coating containing the energy absorbing heavy metal oxide was about 75 microns (0.003 inch). The resultant disc when used in a laser assembly as shown in FIG. 3 performed well and excellent results were obtained without excessive damage to the disc from its use. No evidence of damage due to parasitic oscillation was observed.

EXAMPLE 2

A glass laser disc as described in Example 1 was coated as described in Example 1 with a lead borate composition as follows:

| Ingredient | Percent by Weight |
|---|---|
| $SiO_2$ | 5.24 |
| ZnO | 8.39 |
| PbO | 68.58 |
| $B_2O_3$ | 12.58 |
| CuO | 5.4 |

The coating procedures and testing procedures were substantially the same as described in Example 1 and excellent results were obtained.

EXAMPLE 3

A laser disc as described in Example 1 was coated with a low melting lead borate glass composition having the following approximate composition:

| Ingredient | Percent by Weight |
|---|---|
| $SiO_2$ | 5 |
| ZnO | 8 |
| PbO | 64 |
| $B_2O_3$ | 12 |
| BaO | 0.5 |
| $MnO_2$ | 4.6 |
| $Co_2O_3$ | 5.4 |

In the above examples, other lead borate glass compositions disclosed herein as being useful and containing the heavy metal oxides as energy absorbers disclosed herein can be used in place of the particular lead borate glass coating compositions to provide substantially equivalent results.

What is claimed is:

1. A glass laser disc having an annular coating, the coating comprising a lead borate glass capable of absorbing energy at a wavelength of 1.06 microns to thereby absorb parasitic oscillations, the glass coating having an index of refraction not substantially less than the index of refraction of the glass of the laser disc, the thermal expansion and contraction of the coating being sufficiently compatible with the glass laser disc so as to prevent the developement of undesirable strains in the disc, the glass coating comprising PbO, $B_2O_3$, and an effective energy absorbing amount of a heavy metal oxide that absorbs energy at a wavelength of about 1.06 microns.

2. A disc as defined in claim 1 in which the heavy metal oxide includes $Sm_2O_3$.

3. A disc as defined in claim 1 in which the energy absorbing, heavy metal oxide includes CuO.

4. A disc as defined in claim 2 in which the $Sm_2O_3$ is present in an amount of about 1 – 10% by weight of the total glass coating composition, and the coating is sufficiently transparent to pumping light that the disc can be pumped therethrough.

5. A disc as defined in claim 2 in which the $Sm_2O_3$ is present in an amount of about 2–7% by weight of the total glass composition, and the glass laser disc has the following ingredients in approximate mole percentages:

| Ingredient | Mole Percent |
|---|---|
| $SiO_2$ | 45 – 75 |
| $Al_2O_3$ | 0 – 8 |
| $Li_2O$ | 15 – 35 |
| CaO | 1/2 – 30 |
| $Nd_2O_3$ | 1/10 – 2 |

6. A disc as defined in claim 1 in which the $Sm_2O_3$ is present in an amount of about 10% by weight of the total glass composition of the coating.

7. A disc as defined in claim 3 in which CuO is present in an amount of about 1 – 10% by weight of the total glass composition.

8. A disc as defined in claim 3 in which the CuO is present in an amount of about 2 – 7% by weight.

9. A disc as defined in claim 3 in which the CuO is present in an amount of about 5% by weight of the total glass composition.

10. A disc as defined in claim 1 in which the glass coating has the following approximate composition:

| Ingredient | Percent By Weight |
|---|---|
| $SiO_2$ | 1 – 8 |
| ZnO | 0 – 15 |
| PbO | 50 – 75 |
| $B_2O_3$ | 8 – 16 |
| BaO | 0 – 3 |
| $Sm_2O_3$ | 1 – 10. |

11. A disc as defined in claim 1 in which the glass coating has the following approximate composition:

| Ingredient | Percent By Weight |
|---|---|
| $SiO_2$ | 2 – 7 |
| ZnO | 0 – 12 |
| PbO | 60 – 75 |
| $B_2O_3$ | 8 – 15 |
| BaO | 0 – 2 |
| $Sm_2O_3$ | 1 – 10 |
| CdO | 0 – 2 |
| MgO | 0 – 2 |
| CaO | 0 – 2 |
| SrO | 0 – 2. |

12. A disc as defined in claim 1 in which the glass coating has the following approximate composition:

| Ingredient | Percent by Weight |
|---|---|
| $SiO_2$ | 4 – 7 |
| ZnO | 6 – 10 |
| PbO | 60 – 68 |
| $B_2O_3$ | 10 – 14 |
| BaO | 0.1 – 1 |
| $Sm_2O_3$ | 2 – 7 | and the laser glass disc having the following ingredients in approximate mole percentages:

| Ingredient | Mole Percent |
|---|---|
| $SiO_2$ | 45 – 75 |
| $Al_2O_3$ | 0 – 8 |
| $Li_2O$ | 15 – 35 |
| CaO | 1/2 – 30 |
| $Nd_2O_3$ | 1/10 – 2 |

13. A disc as defined in claim 1 in which the glass coating has the following approximate composition:

| Ingredient | Percent By Weight |
|---|---|
| $SiO_2$ | 5 |
| ZnO | 8 |
| PbO | 64 |
| $B_2O_3$ | 12 |
| BaO | 0.5 |
| $Sm_2O_3$ | 10. |

14. A disc as defined in claim 1 in which the glass coating has the following approximate composition:

| Ingredient | Percent By Weight |
|---|---|
| $SiO_2$ | 1 – 8 |
| ZnO | 0 – 15 |
| PbO | 50 – 75 |
| $B_2O_3$ | 8 – 16 |

| Ingredient | Percent By Weight |
|---|---|
| BaO | 0 – 3 |
| CuO | 1 – 10. |

15. A disc as defined in claim 1 in which the glass coating has the following approximate composition:

| Ingredient | Percent By Weight |
|---|---|
| SiO$_2$ | 2 – 7 |
| ZnO | 0 – 12 |
| PbO | 60 – 75 |
| B$_2$O$_3$ | 8 – 15 |
| BaO | 0 – 2 |
| CuO | 1 – 10 |
| CdO | 0 – 2 |
| MgO | 0 – 2 |
| CaO | 0 – 2 |
| SrO | 0 – 2. |

16. A disc as defined in claim 1 in which the glass coating has the following approximate composition:

| Ingredient | Percent By Weight |
|---|---|
| SiO$_2$ | 4 – 7 |
| ZnO | 6 – 10 |
| PbO | 60 – 68 |
| B$_2$O$_3$ | 10 – 14 |
| BaO | 1 – 2 |
| CuO | 2 – 7. |

17. A disc as defined in claim 1 in which the glass coating has the following approximate composition:

| Ingredient | Percent By Weight |
|---|---|
| SiO$_2$ | 5.24 |
| ZnO | 8.39 |
| PbO | 68.58 |
| B$_2$O$_3$ | 12.58 |
| CuO | 5.24. |

18. A disc as defined in claim 1 in which the energy-absorbing heavy metal oxide is a mixture of MnO$_2$ and Co$_2$O$_3$.

19. A disc as defined in claim 1 in which the glass is a lead-borate glass, and the energy-absorbing oxide is a mixture of about 2 to 7% by weight of MnO$_2$ and 2 to 7% by weight of Co$_2$O$_3$.

20. A disc as defined in claim 1 in which the energy-absorbing oxide comprises a mixture of about 4.6% by weight, based on the weight of the glass of MnO$_2$ and about 5.4% by weight, based on the weight of the glass of Co$_2$O$_3$.

21. A disc as defined in claim 1 in which the glass coating has the following approximate composition:

| Ingredient | Percent By Weight |
|---|---|
| SiO$_2$ | 1 – 8 |
| ZnO | 0 – 15 |
| PbO | 50 – 75 |
| B$_2$O$_3$ | 8 – 16 |
| BaO | 0 – 3 |
| MnO$_2$ | 1 – 10 |
| Co$_2$O$_3$ | 0.01 – 10 | the sum of Co$_2$O$_3$ and MnO$_2$ being not substantially greater than about 15%.

22. A disc as defined in claim 1 in which the glass coating has the following approximate composition:

| Ingredient | Percent By Weight |
|---|---|
| SiO$_2$ | 2 – 7 |
| ZnO | 0 – 12 |
| PbO | 60 – 75 |
| B$_2$O$_3$ | 8 – 15 |
| BaO | 0 – 2 |
| MnO$_2$ | 2 – 10 |
| Co$_2$O$_3$ | 0.1 – 10 |
| CdO | 0 – 2 |
| MgO | 0 – 2 |
| CaO | 0 – 2 |
| SrO | 0 – 2 | the sum of Co$_2$O$_3$ and MnO$_2$ being not substantially greater than about 15%.

23. A disc as defined in claim 1 in which the glass coating has the following approximate composition:

| Ingredient | Percent By Weight |
|---|---|
| SiO$_2$ | 4 – 7 |
| ZnO | 6 – 10 |
| PbO | 60 – 68 |
| B$_2$O$_3$ | 10 – 14 |
| BaO | 0.1 – 1 |
| MnO$_2$ | 2 – 7 |
| Co$_2$O$_3$ | 0.2 – 7 | the sum of Co$_2$O$_3$ and MnO$_2$ being not substantially greater than about 10%.

24. A disc as defined in claim 1 in which the glass has the following approximate composition:

| Ingredient | Percent By Weight |
|---|---|
| SiO$_2$ | 5 |
| ZnO | 8 |
| PbO | 64 |
| B$_2$O$_3$ | 12 |
| BaO | 0.5 |
| MnO$_2$ | 4.6 |
| Co$_2$O$_3$ | 5.4. |

25. A disc as defined in claim 1 in which the heavy metal oxide is an oxide of a transition metal having an atomic number between 23 and 29.

26. A disc as defined in claim 25 in which the transition metal is vanadium.

* * * * *